United States Patent [19]

Plut

[11] Patent Number: 5,398,385
[45] Date of Patent: Mar. 21, 1995

[54] CARGO TRANSPORT ACCESSORY

[76] Inventor: Louis Plut, 471 Wilde Ave., San Francisco, Calif. 94134

[21] Appl. No.: 235,089

[22] Filed: May 2, 1994

[51] Int. Cl.$^6$ ............................ A44B 11/00; B60P 7/00
[52] U.S. Cl. ...................................... 24/301; 24/17 B; 24/68 CD
[58] Field of Search ............... 24/301, 300, 302, 298, 24/68 CD, 17 A, 17 B, 16 R; 280/179 A

[56] References Cited

U.S. PATENT DOCUMENTS

| | | | |
|---|---|---|---|
| 1,782,057 | 11/1930 | Bollinger | 24/301 |
| 3,290,743 | 12/1966 | Hanson | 24/301 |
| 3,896,524 | 7/1975 | Parker | 24/17 B |
| 4,111,132 | 9/1978 | Plut . | |
| 4,367,572 | 1/1983 | Zielenski . | |
| 4,694,541 | 9/1987 | Skyba | 24/301 |
| 5,111,554 | 5/1992 | Sweers . | |
| 5,144,724 | 9/1992 | Chuan | 24/68 CD |

FOREIGN PATENT DOCUMENTS 0000130  3/1979  European Pat. Off. ........ 280/179 A

*Primary Examiner*—Victor N. Sakran
*Attorney, Agent, or Firm*—Ray K. Shahani

[57] ABSTRACT

A modular strap assembly for securing cargo or the like to structural members or other suitable securing apparatus on interior or other cargo space of transport vehicles. The strap can be hooked to itself or something else at one end and tightened at the other end so as to hold the cargo securely in place. Being provided with integrally formed elastic members, the strap can absorb shocks or jarring movements, common during transport and can be viewed as a limited travel elastic shock absorber. This will prevent failure of the strap or fittings as well as eliminate damage to the cargo. The strap is designed to be used in compartments with lateral cross members or other interior fixtures or objects in order to tighten the strap into place and prevent movement of the cargo. Nylon webbing or other suitable material which has integrally formed internal pockets is used for the strap. The tightening device has a floating friction barrel for providing non-slip operation, and a release lever with eccentric cam gears located at ends of the release lever for manually tightening and loosening the strap.

7 Claims, 3 Drawing Sheets

5,398,385

CARGO TRANSPORT ACCESSORY

FIELD OF THE INVENTION

The present invention relates generally to straps, securing devices and related fittings used as cargo or appliance transport accessories, and more particularly, to such an accessory wherein the fittings are integral with the strap, the strap has integral elastic members to absorb shocks and jarring motion during transport, and the fittings include a hook member on one end and a hook with manually releasable strap tightening member on the other.

BACKGROUND OF THE INVENTION

The present invention relates to cargo or appliance transport accessories. There are many types of straps currently available for securing different types of cargo or appliances during transport or for other purposes. Nylon webbing is used frequently for holding objects in place but the fittings which are used, if any, are often awkward to use, can cause scratching or other damage to the cargo, and are not always adaptable to different situations.

Often these straps are inelastic and do not allow for minor shifting of the cargo or for absorption of shocks or jarring motion caused during transport. This often results in strap or fitting failure, thereby rendering the strap useless. Completely elastic straps, however, do not provide adequate security and retention of cargo.

It is often difficult to secure straps without any hooks or other fittings. This is also a problem when using regular rope. Yet sometimes fittings which are supplied with such straps can cause damage to the cargo by scratching or puncturing. Furthermore, often these fittings can slip or fail due to improper design or manufacture.

U.S. Pat. No. 4,111,132, issued Sep. 5, 1978 is hereby incorporated by reference. This patent teaches an appliance transport accessory which attempts to overcome some of the previously noted problems associated with this type of cargo transport equipment, but which does so less efficiently. The present invention has been extensively re-engineered to greatly increase utility on a commercial and industrial scale. The primary improvements hereto obviate the need for the spherical knob of the prior patent thereby making the mechanism much more efficient and efficacious. In the prior art the elastic member has been completely redesigned so as to provide a very strong and stout mechanism which is able to be used in a wide variety of adverse conditions and by unskilled users of the invention. Finally, to enable easy adjustment, tightening and removal of the assembly, the release lever of the present invention has been added to permit release of tension in the strap material.

SUMMARY OF THE INVENTION

The present invention relates to a cargo transport accessory for securing appliances and other types of cargo to the cargo support members of a transport vehicle or other cargo transport equipment. The cargo transport accessory comprises a strap means and a first end, said first end having a first hook member. There is also a second end. An integrally formed elastic section and an attachment means for attaching the elastic section to said strap means and said first hook member at said first end defines and maintains a predetermined length of said strap means adjacent to and in operative relationship with said elastic section, resulting in a limited travel elastic shock absorbing element. The attachment means is a rivet or screws or clamp. A releasable tightening assembly, mounted on said strap means near said second end, has a main body portion. The main body has a second hook member formed integrally thereon and further has a central opening and an opposite end, said opposite end adjacent to said central opening. A barrel member is positioned slidably along said central opening of said main body. A release lever having two opposing cam gears having eccentrically spaced openings therein is mounted on the main body adjacent to the opposite end of the main body.

It is an object of this invention to provide a cargo transport accessory to overcome various problems associated with transport of cargo.

A further object of this invention is to provide a cargo transport accessory which is modular, all fittings are connected to the device, and is convenient to use.

A further object of this invention is to provide a cargo transport accessory which is adaptable to various sized and shaped appliances or other cargo loads, as well as to various sized and shaped cargo securing fixtures on the supporting structures of existing transport vehicles. This invention can be used on trucks, trailers or cars or other vehicles and can also be used on aircraft, boats or ships and in the construction industry for moving or securing almost anything suitable.

A further object of this invention is to provide a cargo transport accessory which has limited travel, integrally formed elastic members so as to provide some degree of shock absorbing function while still maintaining a secure hold of the cargo.

A further object of this invention is to provide a cargo transport accessory wherein the soft strap material is the only part in contact with the cargo, eliminating the use of blankets or other protective padding. Since no metal parts need to come into contact with the subject cargo, there is no need to worry about scratching or damaging the cargo.

A further object of this invention is to provide a cargo transport accessory which is manually tightened and loosened by means of an eccentric cam assembly, and which provides an absolutely slip proof mechanism. The main tensioning barrel can be modified to include a non-slip, enhanced friction surface.

Other advantages and features of the present invention will become apparent from the following detailed description when read in conjunction with the accompanying drawings.

DETAILED DESCRIPTION OF THE PREFERRED EMBODIMENT

Figure 1:
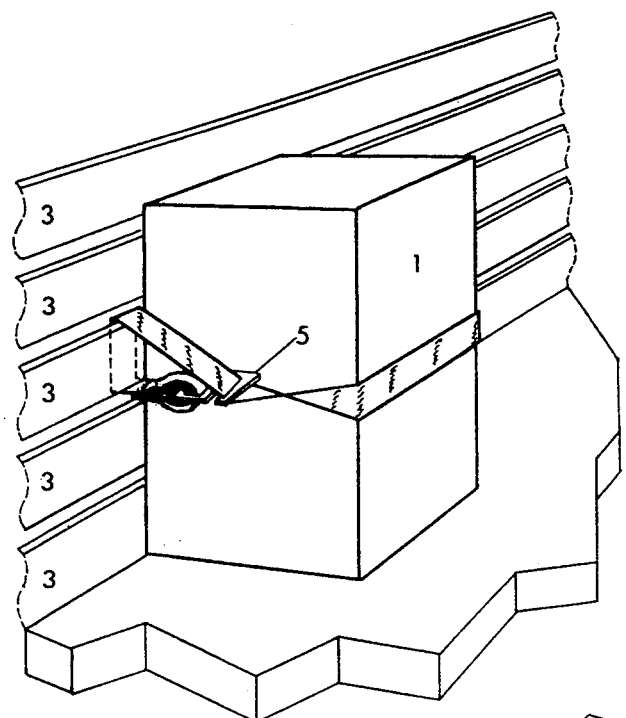
FIG. 1 is a left side perspective view of the invention.

FIG. 1 is a left side perspective view of the invention in operation. Cargo unit 1 is being retained in position against an internal wall structure by restraining lateral members 3, such cross members or their functional equivalents commonly found in transport vehicles. These could include hooks, handles, vertical members, slots in rib members attached to the wall, or other means for restraining cargo. The hook end 5 of the strap is shown in as it would be assembled in place around the cargo before it is tightened into place. As shown, the hook can be placed around the strap completely. Alternatively, the hook could be place through one integrally formed slot formed in the strap portion itself, as will become more apparent.

Figure 2:
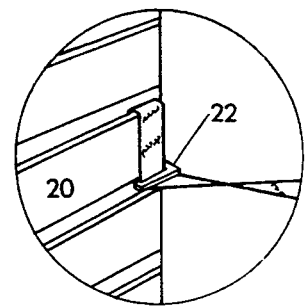
FIG. 2 is a detail view of the engaging hook on the left end.

FIG. 2 is a detail view of the engaging hook on the left end. It will be understood that when the assembly of FIG. 1 is in place, as the strap is tightened, generally from the other end, the hook and attachment means is behind the lateral member 20. Only the leading edge 22 of the hook is visible from the outside when the device is fully installed.

Figure 3:
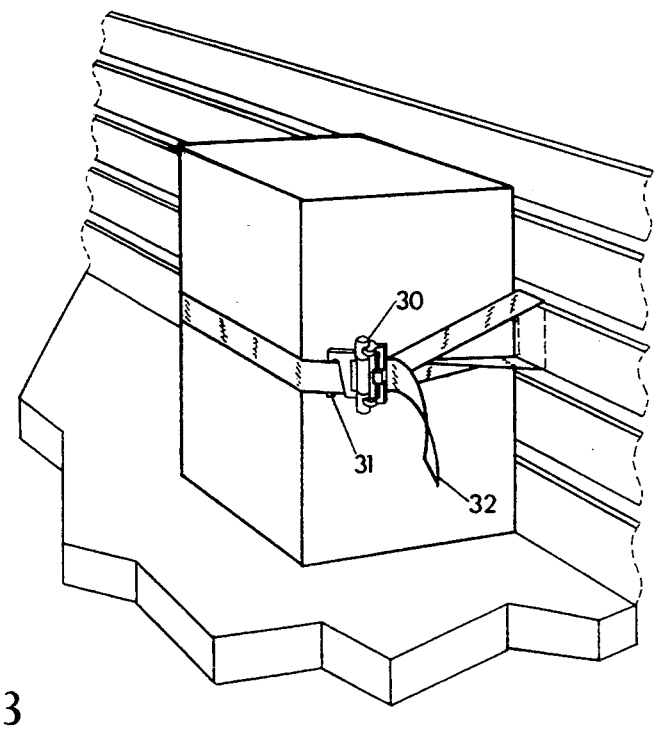
FIG. 3 is a perspective view of the invention showing the releasable tightening assembly in operation.

FIG. 3 is a perspective view of the invention showing the releasable tightening assembly in operation. In this view, the end of the invention with the releasable tightening assembly 30 is shown. The hook member of this end 31 is placed into one of the integrally formed slots in the strap. The end of the strap 32 can be used to manually tighten the assembly into place about the cargo as shown.

Figure 4:
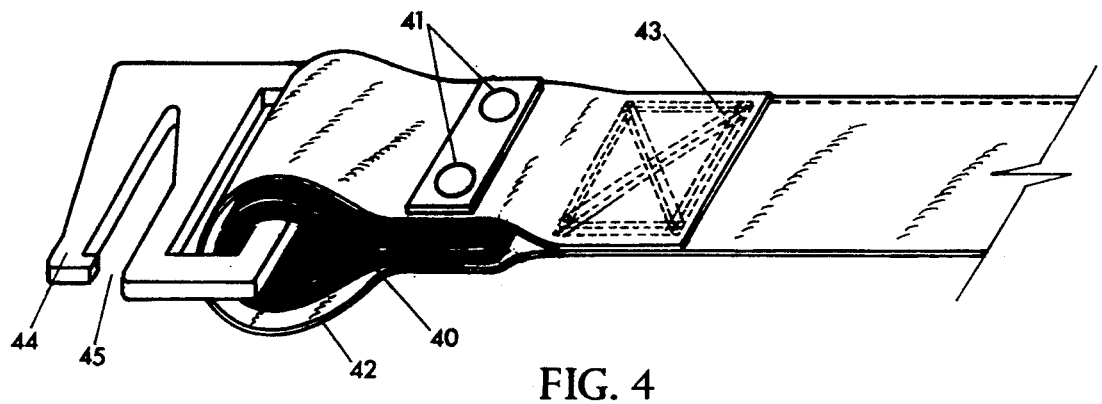
FIG. 4 is an isometric view of the engaging hook on the left end.

FIG. 4 is an isometric view of the engaging hook on the left end. In this view, the hook member shown in FIGS. 1 and 2 is shown in detail. In this embodiment, the integrally formed elastic member 40 is shown. This elastic member can be made of any suitable material, including rubber or neoprene or nylon or other suitable, non-deforming elastic material, which would provide adequate resistance, resilience, elasticity, durability, compatibility and overall suitability. The elastic member could also be comprised of a plurality of such materials in varying configurations and conformations, for example, two or more pieces layered together and operating in concert. It will be understood that this means for absorbing shock or jarring motion could also be placed at one or a plurality of positions on the strap portion, spaced consecutively or otherwise. The elastic member is secured by attachment means 41. The method of attachment shown would be similar to rivets or pressed fittings. Other attachment means can be used and would include thermal or chemical bonding, stitching, one or a plurality or bolts or studs extending therethrough, or other methods known to those skilled in the art.

This attaching means also serves to maintain an excess of strap material 42 loosely covering the elastic member. This excess strap material remains loose when the elastic member is in a relaxed position during operation of the invention. If during transport the elastic member stretches, this fold of material will be taken up. At that point, the strap material will become under tension and will prevent further shifting of the cargo—the amount of excess or loose strap material will define the amount of stretching allowed by the integrally formed elastic member. A typical strap, 1 to 3 inches wide, would have elastic insert members from about 2 to 12 inches long, width similar to or somewhat greater than or somewhat narrower than the strap being used, and about $\frac{1}{4}$ to 1 inch thick. The length of the elastic deformation would generally be between about $\frac{1}{2}$ and 3 inches but could be more or less depending upon the overall dimensions and intended applications of the device. Once the excess slack in the strap material is taken up, the strap itself and the elastic material will absorb additional jarring or moving forces thereon and prevent further shifting of the cargo. The end of the strap material can be secured as shown at 43 by stitching. Other ways of securing this end would be apparent and known to those skilled in the art. Thus, the integrally formed elastic insert member acts as a first absorber of shocks or jars and prevents, at least initially, the jarring or shocking motion from being transferred to the rest of the assembly.

The hook member itself can be forged or stamped or manufactured in many other ways. For the purposes intended herein, a forged or machined hook and body portion will provide the greatest strength and durability. The maximum tensile strength of the fittings can be as high as 2800 pounds or higher. The slot 44 must be large enough to accommodate the strap material used. The extending finger might also have an inturned lip 45 to help retain the hook end about the strap or within a pocket in the strap.

Figure 5:
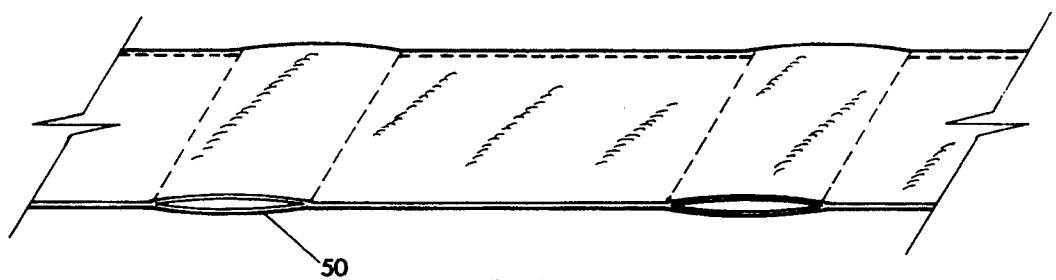
FIG. 5 is an isometric view of an integrally formed pocket in the strap portion.

FIG. 5 shows an isometric view of an individually formed pocket 50 in the strap portion of the device. This type of webbing material is standard and available by various manufacturers. One such manufacturer of slotted nylon webbing is American Cord & Webbing Co., Inc. at 505 Eigth Avenue in New York, N.Y. Webbing of this type might have a maximum load strength of between several hundred and several thousand pounds. A typical type of slotted webbing is $1\frac{3}{4}''$ wide and has a maximum strength of 6000 pounds. The slots might be formed by the stitching pattern used and would generally appear every 8 inches, or more or less depending upon the type of material chosen, spaced consecutively, along portions of the entire length of the material.

Figure 6:
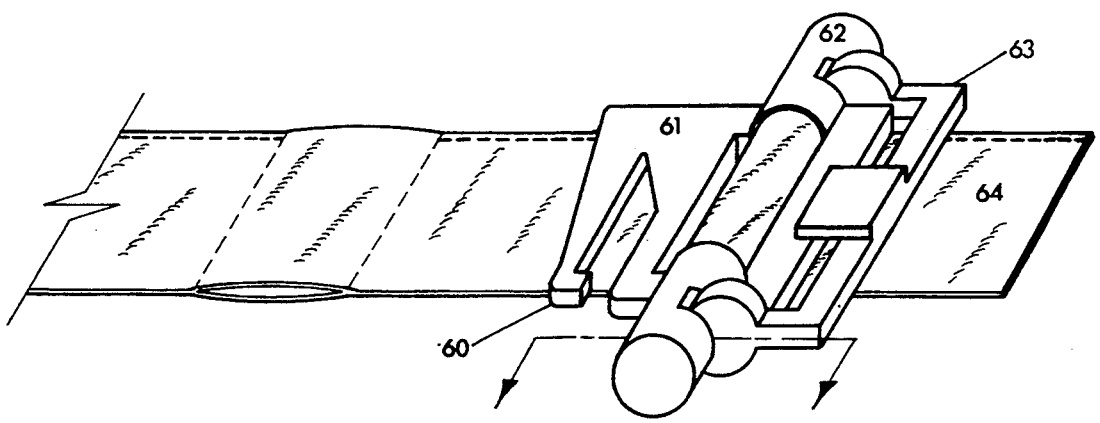
FIG. 6 is an isometric view of the releasable tightening assembly on one end.

FIG. 6 is an isometric view of the releasable tightening assembly on one end. The hook member 60 is formed integral with the assembly body 61, and can be similar to that at the opposite end, as shown in FIGS. 1, 2 and 4. This hook could be used to secure the assembly by inserting the hook member into an integrally formed slot in the webbing. A slidably mounted barrel member 62 is mounted onto the main body of the assembly. This movement is accomplished, in operation, by lifting release lever 63. When the strap 64 is pulled, the assembly is manually tightened about the cargo thereby securing it into position. This manual tightening of the strap causes the barrel member to slide away from the hook member end of the assembly thereby causing impingement and securement of the strap between the barrel member and the back portion of the main body of the assembly. When the release lever is manually lifted, a cam gear drives the barrel member towards the hook member of the assembly and releases the strap from the tensioned position.

Figure 7:
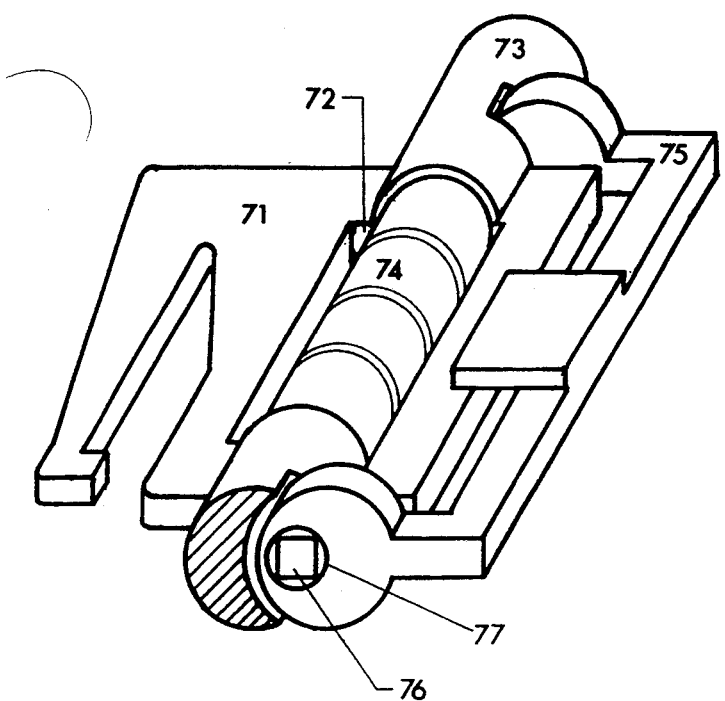
FIG. 7 is an enlarged isometric view of the releasable tightening assembly in the closed position (as it would be under tension).

FIG. 7 is an enlarged isometric view of the releasable tightening assembly in the closed position (as it would be under tension). As shown in FIG. 6, the hook member 60 is formed integral with the main body 71 of the assembly. The main body also has a central opening 72, wide enough to accommodate the webbing material of the strap. A barrel member 73 is positioned within the slot and is able to slide freely along the length of the central opening. In one embodiment, the barrel member could be constructed out of two pieces and have set screws or pins to hold the two pieces together. The barrel can also have some sort of friction surface applied to the central portion of the barrel 74 in contact with the strap material. This will help prevent the webbing material from sliding over the barrel and becoming loose during transport. In one embodiment, the release lever 75 is mounted on studs 76 formed integrally with the main body of the assembly. In this view, only one of said mounting studs is shown but is will be understood that an oppositely positioned stud will be required for mounting the release lever. In the tightened or tensioned position as shown in FIG. 7, the lever is kept in place by the barrel mounted onto the main body. Eccentrically spaced openings 77 in the ends of the release lever provide a type of cam gear. Thus, when the strap is assembled and tightened, the barrel is pulled along the central opening away from the hook end of the main body, and the strap is securely kept in place, squeezed between the barrel and the facing edge of the main body. This is made clear by FIG. 7 showing the cutaway section of FIG. 6.

Figure 8:
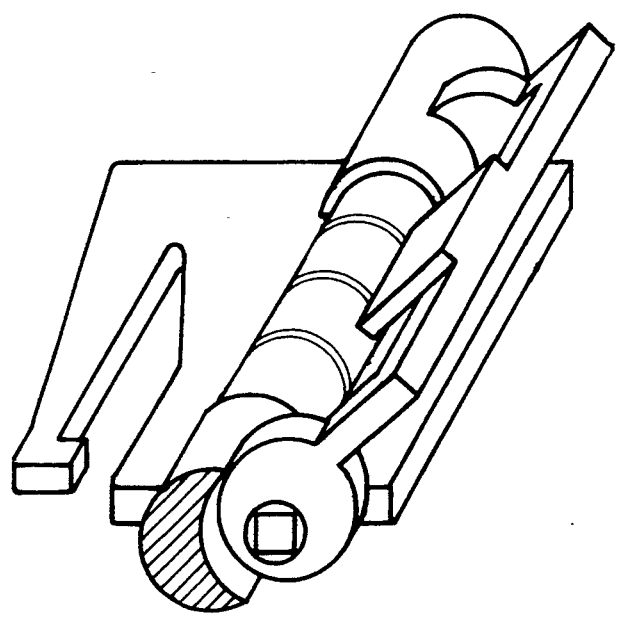
FIG. 8 is another enlarged isometric view of the releasable tightening assembly in the open position (as it would be under minimum or no tension).

FIG. 8 is another enlarged isometric view of the releasable tightening assembly in the open position (as it would be under minimum or no tension). As the release lever is lifted up, the eccentrically mounted release lever pivots about the studs on the main body, drives the barrel back along the length of the central opening, and releases the strap.

Thus, there is disclosed in the above description, a cargo transport accessory having various embodiments and designs. The above description is merely illustrative thereof and various changes or modifications in the design or arrangement or other details of the invention may be within the scope of the appended claims.

I claim:

1. A cargo transport accessory for securing appliances and other types of cargo to the cargo support members of a transport vehicle or other cargo transport equipment, said cargo transport accessory comprising:
 a strap means;
 a first end, said first end having a first hook member;
 a second end;
 an integrally formed elastic section;
 an attachment means, said attachment means attaching said elastic section to said strap means and said first hook member at said first end, said attachment means defining and maintaining a predetermined length of said strap means adjacent to and in operative relationship with said elastic section thereby providing a limited travel, elastic shock absorber;
 and a releasable tightening assembly, said releasable tightening assembly mounted on said strap means and having:
  a main body, said main body having a second hook member formed integrally thereon, said main body further having a central opening and an opposing end, said opposing end adjacent to said central opening;
  a barrel, said barrel being positioned slidably along said central opening of said main body; and
  a release lever, said release lever having a plurality of opposing cam gears, said cam gears having eccentrically spaced openings therein, said release lever mounted on said main body adjacent said opposing end of said main body.

2. The device of claim 1, wherein said strap means has a plurality of operatively spaced and integrally formed pockets therein.

3. The device of claim 1, wherein said strap means is comprised of nylon webbing.

4. The device of claim 1, wherein said barrel has an outer surface which provides enhanced friction between said barrel and said strap means.

5. The device of claim 1, wherein said integrally formed elastic section further comprises a plurality of pieces of elastic material.

6. The device of claim 1, wherein said attachment means is a plurality of rivets.

7. The device of claim 1, wherein said attachment means maintains said strap means adjacent said integrally formed elastic section such that an excess length of strap means is able to operate in conjunction with said integrally formed elastic section, whereby said integrally formed elastic section is able to expand under stress an amount not greater than allowed by said excess length of said strap means thereby providing limited travel elastic shock absorber.

* * * * *